United States Patent [19]

Panzer

[11] 3,910,978
[45] Oct. 7, 1975

[54] AQUEOUS SOLUBLE MIXED COMPLEX SALTS OF ALUMINUM ALIPHATIC ALCOHOL SULFATES

[75] Inventor: George W. Panzer, Timonium, Md.

[73] Assignee: Alcolac, Inc., Baltimore, Md.

[22] Filed: May 31, 1973

[21] Appl. No.: 365,803

[52] U.S. Cl. ............ 260/448 R; 252/8.7; 252/8.75; 252/355; 252/550; 252/551; 260/270 R; 260/429 R; 260/429.9; 260/429 K
[51] Int. Cl.² ............................................ C07F 5/06
[58] Field of Search ..... 260/448 R, 270 R; 252/550, 252/551, 355, 8.7, 8.75

[56] References Cited
UNITED STATES PATENTS

| | | | |
|---|---|---|---|
| 2,304,230 | 12/1942 | Archibald et al. | 260/448 R |
| 2,757,193 | 7/1956 | Zoppa | 260/448 R |
| 2,766,212 | 10/1956 | Grifo | 252/551 X |
| 3,011,977 | 12/1961 | Raecke | 252/550 |
| 3,133,946 | 5/1964 | Maurer et al. | 260/448 R |

*Primary Examiner*—Helen M. S. Sneed
*Attorney, Agent, or Firm*—Finnegan, Henderson, Farabain, & Garrett

[57] ABSTRACT

Mixed complex salts of aluminum sulfate and a neutralized salt of an aliphatic alcohol sulfate are prepared. The mixed complex salts are soluble in aqueous solution and have surface active properties. Ethylene oxide can be introduced into the starting alcohol sulfate to obtain a mixed complex aluminum salt which is completely soluble upon any degree of dilution. Unethoxylated salts become insoluble upon dilution at specific dilution points depending on the cation of the neutralized salt used to form the mixed complex salt.

16 Claims, No Drawings

AQUEOUS SOLUBLE MIXED COMPLEX SALTS OF ALUMINUM ALIPHATIC ALCOHOL SULFATES

This invention relates to soluble aluminum salts of sulfated aliphatic alcohols and ethoxylated alcohols and their method of preparation, and more particularly, to mixed complex organic salts of aluminum sulfate.

The prior art has taught that soluble products having many useful properties, especially strong surface active properties can be obtained by combining the alkali metals, or ammonia, or ethanolamine or certain other organic bases with the sulfated compounds of high molecular weight aliphatic alcohols. These compounds usually have good wetting, sudsing, emulsifying and/or detergent properties. Alkali metal products of this type are soluble in water which make them especially useful in detergent compositions. Heavy metal salts, as opposed to alkali metal salts of the above sulfonated compounds, are not as predictable in their solubility behavior in aqueous solutions and are often insoluble.

The prior art does recognize, however, that some heavy metal sulfonated salts are soluble in aqueous solutions, but aluminum salts are not known for their solubility. For example, it is known that aluminum lauryl sulfate is insoluble in an aqueous solution. Thus, Shigeru Miyamoto in his article "The Effect of Metallic Ions On Surface Chemical Phenomena II," Mem. Fac. Sci. Kyushu University, Series C, Vol. III, No. 3, 1960, reports the solubility of aluminum dodecyl sulfate as being only $9.25 \times 10^{-5}$ moles per kg $H_2O$. The article describes the preparation of aluminum dodecyl sulfate by mixing $5 \times 10^{-4}$ liters of pure sodium dodecyl sulfate with pure aluminum chloride. This procedure, however, leads to an insoluble form of aluminum lauryl sulfate.

SUMMARY OF THE INVENTION

In accordance with the present invention, it has been found that novel organic aluminum salts that are soluble in water can be prepared which are mixed complex metal salts of aluminum sulfate and a neutralized salt of an aliphatic alcohol sulfate. The neutralized salt of the aliphiatic alcohol sulfate used to prepare the aluminum salts of the present invention may be ethoxylated. The soluble mixed complex salts of the present invention have the general formula I:

I. 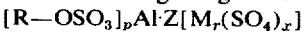

in which R is an aliphatic radical having 1 to 30 carbon atoms; $n$ is the number of ethylene oxide groups and can be from 0 to about 100; M is a cation having a valence of $x$, and generally is an alkali metal, alkaline earth metal, heavy metal excluding aluminum, or nitrogen containing base such as ammonia, ethanolamine, and the like; $x$ is the hydrogen equivalence value of M and can be 1 or 2; and I can be a number from about 0.001 to about 6.

The present invention also provides aqueous solutions which contains from about 10 to about 60%, and preferably 10 to 35%, of the above novel soluble salts, based on the total weight of the solution.

The present invention also provides a method of preparing the soluble mixed complex organic aluminum salts which comprises adding aluminum sulfate to a concentrated aqueous solution of a neutralized salt of an aliphatic alcohol sulfate. The concentration of the aqueous solution of the neutralized salt is between about 10 and 60 percent. If the solution of the neutralized salt is too dilute, the addition of the aluminum sulfate will result in the formation of a precipitate and the soluble mixed complex organic aluminum salts of the present invention will not be formed.

When the neutralized salt of the aliphatic alcohol sulfate used to prepare the novel aluminum salts of the present invention is ethoxylated, the novel aluminum salts are found to be completely soluble in water at substantially all concentrations or degrees of dilution. The degree of ethoxylation necessary to bring about the solubilization at high degrees of dilution varies with the number of carbon atoms in the aliphatic radical, with a greater degree of ethoxylation being required as the number of carbon atoms increases. When the neutralized salt does not contain any ethoxy groups, however, the aqueous solution of the soluble aluminum salts can be diluted to a point where a novel precipitate forms. The precipitate is an insoluble aluminum aliphatic alcohol sulfate having the general formula:

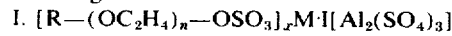

wherein R and M are defined as above, $p$ is from 0.167 to 6; Z is from 0 to 1; $r$ is 1 or 2; $r$ is 1 when $x$ is 2 and $r$ is 2 when $x$ is 1. The point where the precipitate forms is specific for each salt so that the formation of the precipitate can be controlled and obtained whenever it is desired. The precipitate can contain small amounts of ethoxy groups when higher aliphatic alcohols are used.

The aqueous solutions of the present invention have valuable surface active properties, excellent substantivity, emulsifying and foaming properties, and are compatible with foam boosters. The solutions can be used in compositions as wash anti-snag and antistats for woolens, synthetics, panty hose, lingeries and the like.

DETAILED DESCRIPTION OF THE INVENTION

In accordance with the invention, the soluble mixed complex salt of the present invention is formed by mixing aluminum sulfate with an aqueous solution of a neutralized aliphatic alcohol sulfate. The aluminum sulfate is commercially obtainable as a solid and can be added as such to the aqueous solution of the neutralized aliphatic alcohol sulfate, or preferably can be added as an aqueous solution. If an aqueous solution of aluminum sulfate is used, it preferably contains 5 to 50 weight percent of aluminum sulfate, based on the weight of the solution. The aqueous solution of neutralized aliphatic alcohol sulfate preferably contains 10 to 60% of neutralized aliphatic alcohol sulfate, based on the weight of the solution. The concentrations of the solutions are chosen so that the final solution will have an active theory content of the mixed complex organic aluminum salt of between about 10 to 60%, and preferably 10 to 35%.

The addition of the aluminum sulfate to the aqueous solution of the neutralized salt of the aliphatic alcohol sulfate is carried out preferably at room temperature to about 50°C. with stirring.

The neutralized salt of the aliphatic alcohol sulfate used in the present invention can be prepared in accordance with known techniques. Generally, these salts are formed by neutralizing an aliphatic sulfuric acid known as an acid sulfate with an appropriate base such as a metal hydroxide or oxide. The acid sulfates are prepared by sulfating aliphatic straight or branched chain alcohols such as hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoleyl alcohol, melissyl alcohol, ceryl alcohol, carnaubyl alcohol, myricyl alcohol, branched chain octyl, decyl, dodecyl, tridecyl, tetradecyl, hexadecyl and octadecyl aliphatic alcohols as, for example, 2-ethyl hexanol-1, 2-n butyl octanol-1, 2-butyl tetradecanol-1, and, in general, the higher molecular weight saturated and unsaturated aliphatic straight chain and branched chain alcohols. Preferably, the alcohols which are utilized are those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like. Those alcohols containing from 8 to 22 carbon atoms being preferred. Other alcohols which may be employed are the cyclo aliphatic or alicyclic alcohols such as the sterols as, for example, cholesterol, iso-cholesterol, phytosterol, silisterol, and such unsaturated alcohols as linalool, cintroneliol, geraniol and the like and hydrogenation products of the foregoing. Also included within the class of alcohols which may be employed are such compounds as the hydroxy and alpha-hydroxy higher aliphatic and fatty acids as, for example, ricinoleic acid, alphahydroxy stearic acid, alpha-hydroxylauric acid, di-hydroxy stearic acid, i-hydroxy-stearic acid, alpha-hydroxy palmitic acid, and the like, as well as esters of hydroxy-fatty acids, such as ethyl ricinoleate, castor oil, butyl alpha-hydroxystearate, cetyl hydroxystearate, and the like.

The term "alcohols", as employed herein, is intended to include alcohols which may or may not contain other groups such as carboxylic, halogen, sulfonic, sulfate, or other radicals. The alcohols obtainable by substituting alkyl or acyl radicals, preferably of high molecular weight, in place of the hydrogen of one or more hydroxy groups or polyhydroxy substances or polyhydric alcohols, it being understood that at least one hydroxy group attached to the nucleus of the polyhydroxy substance or polyhydric alcohol remains, are also within the scope of the alcohols from which the sulfates may be produced. As examples of such alcohols may be mentioned, partially esterified or partially etherified, sugars and sugar alcohols such as monolauric acid ester of sucrose, monostearic acid ester of dextrose, monopalmitic acid ester of mannitol, dicaproic acid ester of maltose, mono-octyl ether of sorbitol, monolauryl ether of pentracrythritol, monolauric acid ester of pentaerythritol, and the like; the monoglycerides and diglycerides, preferably of the higher fatty acids, as, for example, monolaurin, monomyristin, monostearin, distearin, diolein, dicaproin, monolauryl ether of glycerol, ci-cetyl ether of glycerol, monostearic acid ester of diethylene glycol, monolauric acid ester of ethylene glycol, and the like.

It is, of course, obvious that the alcohols from which the sulfates may be produced may be prepared in accordance with any desired method. For example, many of these alcohols may be prepared by the so-called Bouveault and Blanc method, or alternatively, by the reduction or catalytic reduction with hydrogen of natural or hydrogenated animal or vegetable fats and oils, or mixtures thereof, in accordance with well known practices. Again the alcohols may be derived from synthetic processes such as by the oxidation of hydrocarbons or may be prepared by saponification of waxes and the like. Alternatively, they may be prepared by reduction of aldehydes or by the Grignard reaction.

It is likewise apparent that mixtures of the foregoing or other alcohols may be utilized in the preparation of the sulfates as, for example, the mixture of alcohols resulting from the hydrogenation of coconut oil or the free fatty acids of coconut oil. Such a hydrogenation produces an alcohol mixture where lauryl alcohol comprises about 45% of the total alcohol mixture, the remaining alcohols running from $C_4$ to $C_{18}$. Again, mixtures of alcohols such as are present in the so-called sperm oil alcohols, as well as those present in wool-fat, may equally efficaciously be utilized. Indeed, these higher molecular weight alcohols are generally offered on the market in the form of mixtures of different alcohols. If desired for any specific purpose, special fractions which predominate in a certain particular higher molecular weight alcohol may be utilized or, if so desired, the products may be prepared from a single, substantially pure alcohol.

The neutralized sulfates of these alcohols may be represented by the formula:

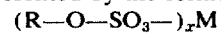

$(R-O-SO_3-)_xM$ wherein R represents the residue of an alcohol containing from 1 to 30 carbon atoms. M represents a cation or the residue of a salt-forming compound such as sodium, mono-ethanolamine or the like, and x is a small whole number, at least one.

The neutralized sulfates described are usually prepared from the acid sulfates by neutralizing the acid sulfate by anti-acid materials and, in this connection, considerable latitude and modification may be exercised. In general, inorganic as well as organic anti-acid agents may be employed, examples of which are carbonates, bicarbonates and hydroxides of the alkali metals (including ammonium), sodium oxide, ammonia gas, magnesium oxide, magnesium carbonate, organic anti-acid nitrogenous materials including amines, alcohol and alkylol amines such as, for example, mono-, di, and triethanolamine and mixtures thereof, propanolamines, butanolamines, polynitrogenous amines such as ethylene diamine, ethylene triamine and the like, pyridine, methylpyridine, piperidine, quaternary ammonium bases such as tetra-ethyl ammonium hydroxide, tetra-methyl ammonium hydroxide, and in general, primary, secondary and tertiary amines substituted or not with other radicals such as hydroxy, alkyl, aryl, cycloalkyl groups, and the like. it will be understood that by the term "cation", as used herein, is meant such elements as have been mentioned and, in general, atoms or radicals which are regarded as bearing a positive charge or capable of replacing acidic hydrogen. The reaction products may be neutralized to any extent desired as, for example, to methyl orange, litmus or phenolphthalein. The sulfates referred to hereinabove are described, among other places, in the following U.S. pat. Nos. 1,897,741; 1,968,793; 1,968,794; 1,968,796; 1,968,797; 2,006,309; 2,023,387; 2,052,027; and 2,077,005.

The neutralized salts used to prepare the novel soluble organic aluminum salts of the present invention can be ethoxylated. These ethoxylated neutralized salts can be prepared by first condensing the aliphatic alcohol with ethylene oxide and sulfating the product thus obtained. For example, technically pure lauryl alcohol can be ethoxylated by using an amount of ethylene oxide corresponding to the desired average number of ethoxy groups. The ethoxylated alcohol is then sulfated, and the sulfated product is neutralized with an appropriate base such as sodium hydroxide as described above. When ethoxy groups are introduced into the neutralized salt $n$ in formula I is from about 0.5 to 100, and preferably is between about 1 to 50. When the ethoxy groups are present in the neutralized salt, the resulting aqueous solution of the soluble, complex mixed organic aluminum salts of this invention generally can be diluted with water to any degree of dilution without formation of an insoluble precipitate. The degree of ethoxylation necessary to bring about the solubilization of the complex mixed organic aluminum salts increases as the molecular weight of the aliphatic radical increases. For example, a mixed, complex aluminum lauryl sulfate can be diluted to practically any degree of dilution when it contains an average of about one ethoxy group per molecule whereas a myristyl salt usually needs a greater number of ethoxy groups such as about three to six per molecular to be soluble at all degrees of dilution. When no ethoxy groups are introduced into the neutralized aliphatic alcohol sulfate, the resulting mixed complex organic aluminum salts of this invention are soluble in water at concentrations of from about 10 to 60 percent. When these concentrated aqueous solutions are diluted, however, insoluble precipitates will form.

The concentrations of the aqueous solutions of neutralized aliphatic alcohol sulfate used to prepare the novel mixed complex organic aluminum salts of the present invention is chosen in relation to the moles of aluminum sulfate that are to be used so that the number of moles of aluminum sulfate per mole of neutralized salt is between about 0.001 to 6. Preferably, chemical equivalent weight amounts of the aluminum sulfate and neutralized salt are used. For example, 1 mole of sodium lauryl sulfate is a chemical equivalent amount of 1/6 of a mole of aluminum sulfate.

The aqueous compositions of the present invention can be used in a variety of cosmetic compositions such as shampoos, skin care products and bath products to provide a skin or hair conditioning effect. The aqueous compositions also have valuable bacteriocidal, fungicidal and astringent properties and thus can be used in a variety of pharmaceutical as well as cosmetic products. The aqueous compositions are also valuable as lubricants and dyeing aids for textile fibers.

The aqueous solutions also have valuable detergent properties. The aqueous solutions are often diluted in use so that the insoluble precipitates of this invention are formed which contribute to the desired performance properties.

The following examples are given by way of illustration to further explain the principles of the invention. These examples are merely illustrative and are not to be understood as limiting the scope and underlying principles of the invention in any way. All percentages referred to herein are by weight unless otherwise specifically indicated.

In the following examples and throughout the specification, water dilution percentages are calculated as the amount of water added to dilute the solution divided by the total weight of the diluted solution. For example, if a solution initially weights 100 grams and 50 grams of water are added to dilute it, the water dilution is 33.33%. The following examples use commercial grades of neutralized aliphatic alcohol sulfate where the aliphatic radical comprises a mixture of aliphatic chains, with each mixture having a predominant radical which identifies it. The mixture of radicals for the sulfate used in each example is represented by R'. Commercial grades of aluminum sulfate are also used in the Examples and all calculations include any water of hydration that may be present in the aluminum sulfate.

EXAMPLE 1

To 11,032.7g of an aqueous solution containing 27.37% of a commercial grade of sodium lauryl sulfate made from a mixture of $C_{10}$ to $C_{18}$ alcohols having an average chain length of $C_{12}$ and an equivalent weight of 293 is added 8967.3g of an aqueous solution containing 11.38% of $Al_2(SO_4)_3 \cdot 14H_2O$. The I ratio of the resulting solution is 0.167. The solution is stirred at room temperature for 15 minutes to give a theoretical or theory active solution of 15.0% calculated as aluminum lauryl sulfate and represented as $Al(LS)_3$ at an equivalent weight of 279. The actual active solution is determined by the standard para-toluidine test to be 14.4% calculated as aluminum lauryl sulfate. The final resulting solution is clear, free of precipitate, and has a pH of 3.9. The solution contains a soluble mixed complex aluminum salt which corresponds to the general formula $R'OSO_3Na \cdot 0.167Al_2(SO_4)_3 \cdot 14H_2O$, where R' represents the mixture of $C_{10}$ to $C_{18}$ radicals.

A portion of the solution containing 100g is diluted with 1500g of water representing a 93.75% dilution. An insoluble precipitate forms which is then isolated by filtration. The insoluble precipitate is air dried and weighs 14.3g on a dry basis. The precipitate is analyzed and has the following composition:

| | Found |
|---|---|
| R'OSO$_3$ | 86.02% |
| Organic Sulfur | 10.79% |
| Aluminum | 2.82% |
| Inorganic Sulfate | 0.58% |

The analysis establishes an empirical formula for the precipitate salt of $(R'OSO_3)_4Al \cdot 0.05Na_2SO_4$.

EXAMPLE 2

The procedure of Example 1 is repeated except that 200g of an aqueous solution containing 14.6% of sodium lauryl sulfate having an equivalent weight of 297.6 is added to 251.61g of an aqueous solution containing 9.16% of $Al_2(SO_4)_3 \cdot 14H_2O$. The I ratio of the resulting solution is 0.167. The solution is stirred at room temperature to give a theory active solution of 15% calculated as $Al(LS)_3$ at an equivalent weight of 283.6. The final resulting solution is clear, free of precipitate, and has a pH of 3.9. The solution contains a soluble mixed complex aluminum salt which corresponds to the general formula $R'OSO_3Na \cdot 0.167Al_2(SO_4)_3 \cdot 14H_2O$.

A portion of the solution containing 100g is diluted with 1500g of water representing a 93.75% dilution. An insoluble precipitate forms which is then isolated by filtration. The insoluble precipitate is air dried and weighs 14.4g on a dry basis. The precipitate is analyzed and has the following composition:

| | Found |
|---|---|
| R'OSO$_3$ | 84.93% |
| Organic Sulfur | 7.1% |
| Aluminum | 2.84% |
| Inorganic Sulfate | 1.62% |

The analysis establishes an empirical formula for the precipitate salt of $(R'OSO_3)_{3.3}Al \cdot 0.1Na_2SO_4$.

EXAMPLE 3

The procedure of Example 1 is repeated except that 100g of an aqueous solution containing 26.9% of sodium oleyl sulfate having an equivalent weight of 362 is added to 72.4g of an aqueous solution containing 10.22% of $Al_2(SO_4)_3 \cdot 14H_2O$. The I ratio of the resulting solution is 0.167. The solution is stirred at room temperature to give a theory active solution of 15% calculated as aluminum oleyl sulfate. The final resulting solution is clear and free of precipitate. The solution contains a soluble mixed complex aluminum salt which corresponds to the general formula $R'OSO_3Na \cdot 0.167Al_2(SO_4)_3 \cdot 14H_2O$ A portion of the solution containing 100g is diluted with 1500g of water representing a 93.75% dilution. An insoluble precipitate forms.

EXAMPLE 4

The procedure of Example 1 is repeated except that 189.5g of an aqueous solution containing 28.5% of sodium lauryl sulfate having an equivalent weight of 305 is added to 49.7g of an aqueous solution containing 42.25% of $Al_2(SO_4)_3 \cdot 18H_2O$. The I ratio of the resulting solution is 0.199. The solution is stirred at 45°C for 5 minutes to give a theory active solution of 27.2% calculated as $Al(LS)_3$ at an equivalent weight of 291. The final resulting solution is clear and free of precipitate. The solution contains a soluble mixed complex aluminum salt which corresponds to the general formula $R'OSO_3Na \cdot 0.199Al_2(SO_4)_3 \cdot 18H_2O$.

EXAMPLE 5

The procedure of Example 1 is repeated except that 103.2g of an aqueous solution containing 28.2% of magnesium lauryl sulfate having an equivalent weight of 291 is added to 88.8g of an aqueous solution containing 22.9% of $Al_2(SO_4)_3 \cdot 14H_2O$. The I ratio of the resulting solution is 0.333. The solution is stirred at room temperature for 15 minutes to give a theory active solution of 15% calculated as aluminum lauryl sulfate. The final resulting solution is clear, free of precipitate, and has a pH of 3.1. The solution contains a soluble mixed complex aluminum salt which corresponds to the general formula $(R'OSO_3)_2Mg \cdot 0.333Al_2(SO_4)_3 \cdot 14H_2O$.

EXAMPLE 6

The procedure of Example 1 is repeated except that 107g of an aqueous solution containing 39.4% of triethanolamine lauryl sulfate having an equivalent weight of 422 is added to 79.8g of an aqueous solution containing 24.81% of $Al_2(SO_4)_3 \cdot 14H_2O$. The I ratio of the resulting solution is 0.333. The solution is stirred at room temperature to give a theory active solution of 15% calculated as aluminum lauryl sulfate. The final resulting solution is clear, free of precipitate, and has a pH of 3.6. The solution contains a soluble mixed complex aluminum salt which corresponds to the general formula $R'OSO_3N(C_2H_5O)_3 \cdot 0.333Al_2(SO_4)_3 \cdot 14H_2O$.

EXAMPLE 7

The procedure of Example 1 is repeated except that 2000g of an aqueous solution containing 27.3% of ammonium lauryl sulfate having an equivalent weight of 293 is added to 1528g of an aqueous solution containing 13.58% of $Al_2(SO_4)_3 \cdot 18H_2O$. The I ratio of the resulting solution is 0.167. The solution is stirred at room temperature to give a theory active solution of 15% calculated as aluminum lauryl sulfate. The final resulting solution is clear, free of precipitate, and has a pH of 3.8. The solution contains a soluble mixed complex aluminum salt which corresponds to the general formula $R'OSO_3NH_4 \cdot 0.167Al_2(SO_4)_3 \cdot 18H_2O$.

A 100g sample of the final solution of Examples 1, 5, 6 and 7 is diluted with water until an insoluble precipitate appears. The specific dilution ratios at which each sample exhibits the formation of an insoluble precipitate is shown in Table 1 below.

TABLE 1

| Example | % Theory Active (Actual) | Cation | % Water dilution for appearance of Insoluble ppt. |
|---------|--------------------------|--------|---------------------------------------------------|
| 1 | 15(14.4) | Na | 52.4% |
| 7 | 15 | $NH_4$ | 53.3% |
| 5 | 15 | Mg | 68.3% |
| 6 | 15 | $N(C_2H_5O_3)$ | 76.1% |

Table 1 shows that the dilution point at which the mixed salts become insoluble differs depending on the cation of the neutralized alcohol salt.

EXAMPLE 8

This example illustrates the preparation of a mixed complex aluminum salt which is completely soluble in water at any degree of dilution.

The procedure of Example 1 is repeated except that 100g of an aqueous solution containing 27.0% of ammonium lauryl ether sulfate having one mole of ethylene oxide per mole of ether sulfate and an equivalent weight of 344 is added to 75.3g of an aqueous solution containing 11.55% of $Al_2(SO_4)_3 \cdot 18H_2O$. The I ratio of the resulting solution is 0.166. The solution is stirred at room temperature to give a theory active solution of 15% calculated as aluminum lauryl ether sulfate. The final resulting solution is clear and free of precipitate. The solution contains a soluble mixed complex aluminum salt which corresponds to the general formula $R^1(OCH_2CH_2)_1OSO_3NH_4 \cdot 0.166Al_2(SO_4)_3 \cdot 18H_2O$.

A portion of the solution is diluted with water to a 98% dilution to give a clear solution without formation of insoluble precipitate.

EXAMPLE 9

The procedure of Example 8 is repeated except that 100g of an aqueous solution containing 26.2% of ammonium lauryl ether sulfate having 3.5 moles of ethylene oxide per mole of ether sulfate at an equivalent weight of 451 is added to 71.0g of an aqueous solution containing 9.01% of $Al_2(SO_4)_3 \cdot 18H_2O$. The I ratio of the resulting solution is 0.165. The solution is stirred at room temperature to give a theory active solution of 15% calculated as aluminum lauryl ether sulfate. The final resulting solution is clear and free of precipitate. The solution contains a soluble mixed complex aluminum salt which corresponds to the general formula $R^1(OCH_2CH_2)_{3.5}OSO_3NH_4 \cdot 0.165Al_2(SO_4)_3 \cdot 18H_2O$.

A portion of the solution is diluted with water to a 99.3% dilution to give a clear solution without formation of an insoluble precipitate.

EXAMPLE 10

The procedure of Example 8 is repeated except that 100g of an aqueous solution containing 38.9% of ammonium 2-ethyl hexyl ether sulfate having 12 ethoxy groups per mole and an equivalent weight of 780 is added to 156.33g of an aqueous solution containing 3.15% of $Al_2(SO_4)_3 \cdot 14H_2O$. The I ratio of the resulting solution is 0.167. The solution is stirred at room temperature to give a theory active solution of 15% calculated as aluminum 2-ethyl hexyl ether sulfate. The final resulting solution is clear and free of precipitate. The solution contains a soluble mixed complex aluminum salt which corresponds to the general formula $R^1(OCH_2CH_2)_{12}OSO_3NH_4 \cdot 0.167Al_2(SO_4)_3 \cdot 14H_2O$.

A portion of the solution is diluted with water to a 99.3% dilution to give a clear solution without formation of an insoluble precipitate.

EXAMPLE 11

The procedure of Example 8 is repeated except that 177g of an aqueous solution containing 21.7% of sodium lanolin mixed alcohol ether sulfate having an average of 1.5 ethoxy groups per mole and an equivalent weight of 385 is added to 70.13g of an aqueous solution containing 28.23% of $Al_2(SO_4)_3 \cdot 14H_2O$. The ethoxy alcohols comprise a mixture of 16% lanolin, 2% oleyl alcohol, and 59% lauryl alcohol. The I ratio of the resulting solution is 0.333. The solution is stirred at room temperature to give a theory active solution of 15% calculated as aluminum lanolin mixed alcohol ether sulfate salt. The final resulting solution is clear, free of precipitate, and has a pH of 3.5. The solution contains a soluble mixed complex aluminum salt which corresponds to the general formula $R^1(OC_2H_4)_{1.5}OSO_3 \cdot Na \cdot 0.333Al_2(SO_4)_3 \cdot 14H_2O$.

A portion of the solution is diluted with water to a 96.87% dilution before any noticeable amount of insoluble precipitate forms.

EXAMPLE 12

The procedure of Example 8 is repeated except that 217g of an aqueous solution containing 28.0% of ammonium myristyl ether sulfate having 6 ethoxy groups per mole and an equivalent weight of 608 is added to 182.9g of an aqueous solution containing 5.41% of $Al_2(SO_4)_3 \cdot 14H_2O$. The I ratio of the resulting solution is 0.167. The solution is stirred at room temperature to give a theory active solution of 15% calculated as aluminum myristyl ether sulfate. The final solution is clear and free of precipitate. The solution contains a soluble mixed complex aluminum salt which corresponds to the general formula $R^1(OCH_2CH_2)_6OSO_3NH_4 \cdot 0.167Al_2(SO_4)_3 \cdot 14H_2O$.

A portion of the solution is diluted with water to a 95.5% dilution and give no evidence of insolubility.

EXAMPLE 13

This example illustrates the foaming properties of aqueous solutions containing the salts of the present invention. Foam tests are conducted on the 15% theory active solutions of Examples 1, 5, 6 and 11. The foam test is performed by placing a sample from each solution in a 250 ml. graduated cylinder and shaking 50 6 The initial foam heights are reported in Table 2 below as a function of % theory activity of the solution. The solutions of the tested Examples are diluted to various degrees of activity and the initial foam at each degree of activity is reported. The initial foam heights for the salts of Examples 1 and 5 are performed on both the soluble mixed complex form of the salt and on the insoluble form of salt by going through the dilution point at which the insoluble form appears.

TABLE 2

| % Theory Active Solution | Ex. No. | Initial Foam Height (ml) | | | |
|---|---|---|---|---|---|
| | | 1 | 5 | 6 | 11 |
| As is 15% | | 40 | 80 | 100 | 100 |
| 13.5% | | 87 | 127 | 127 | 127 |
| 12.0% | | 123 | 153 | 163 | 153 |
| 9.0% | | 200 | 200 | 210 | 210 |
| 7.5% | | 230 | 240 | 270 | 246 |
| 6.0% | | 205* | 205 | 205 | 205 |
| 4.5% | | 277 | 277* | 267 | 267 |
| 1.5% | | 180 | 150 | 160 | 280 |
| .075% | | 160 | 140 | 150 | 280 |

*= Appearance of insoluble form.

EXAMPLE 14

The compatibility of the active solutions of this invention with a foam booster is tested by adding 100g of the 15% theory active solution of Example 12 to 5g of a coconut mono ethanolamide, a known foam booster. The resultant product is a clear viscous liquid. A sample of the liquid is diluted to a 95.5% dilution with water and no evidence of insoluble precipitates is observed.

EXAMPLE 15

A 100g solution containing a sodium lauryl sulfate/amide blend is prepared by mixing 81.5g of an aqueous solution containing 28.5% sodium lauryl sulfate having an equivalent weight of 305 with 7.33g of a coco monoethanolamide and sufficient water to form 100g of solution. To this 100g solution is added 47.4g of an aqueous solution containing 15.82% $Al_2(SO_4)_3 \cdot 14H_2O$. The I ratio of the resulting solution is 0.166. The resulting solution is a clear viscous liquid and can be diluted to a water dilution of 75.6% before an insoluble form appears.

EXAMPLE 16

To 100g of the 15% theory active solution of Example 9 is added 5g of a coco monoethanolamide. The resultant solution is a clear viscous liquid. A sample is diluted with water to a 95.0% water dilution. The sample gives no evidence of any insoluble precipitate.

EXAMPLE 17

In accordance with the procedure of Example 13, foam tests are performed on the salts of Examples 12, 14, 3, 15 and 16. The tests are conducted on solutions containing 0.75% active salt as aluminum alkyl or alkyl ether sulfate at 40°C. The initial foam height and the height after 1 minute intervals are reported in Table 3 below.

TABLE 3

| Salt of Example No. | Foam Height (ml) vs. time (min.) | | | |
|---|---|---|---|---|
| | 0 min. | 1 min. | 2 min. | 3 min. |
| 12 | 200 | 184 | 165 | 160 |
| 14 | 255 | 242 | 234 | 218 |
| 3 | 160 | 141 | 124 | 120 |
| 15 | 218 | 206 | 186 | 170 |
| 16 | 250 | 240 | 234 | 227 |

The invention in its broader aspects is not limited to the specific details shown and described and departures may be made from such details without departing from the principles of the invention and without sacrificing its chief advantages.

What is claimed is:

1. An aqueous solution of from about 10 weight % to about 60 weight % of a soluble mixed complex salt having the formula:

$[R—(OC_2H_4)_n—OSO_3]_x·M·l[Al_2(SO_4)_3]$ wherein R is the radical of an aliphatic alcohol having from 1 to 30 carbon atoms, $n$ is a number from 0 to 100, M is a cation having a valence of $x$ selected from the group consisting of alkali metal, alkaline earth metal, and nitrogen containing base radicals, $x$ is the equivalence value of M and can be 1 or 2, and I is a number from 0.001 to 6.

2. The aqueous solution of claim 1 wherein R is an alkyl group of from 8 to 22 carbon atoms.

3. The aqueous solution of claim 1 wherein I is from 0.167 to 1.

4. The aqueous solution of claim 1 wherein R is a lauryl, oleyl, 2-ethyl hexyl, myristyl, or lanolin radical.

5. The aqueous solution of claim 4 wherein M is sodium, magnesium, an ammonium radical, or an ethanolamine radical.

6. The aqueous solution of claim 1 wherein n is from 0.5 to 100.

7. The aqueous solution of claim 1 wherein n is from 1 to 50.

8. The aqueous solution of claim 1 wherein n is 0.

9. The aqueous solution of claim 1 wherein the amount of salt is between about 10 weight % and 35 weight %, based on the weight of the solution.

10. A method of producing a soluble mixed complex aluminum salt comprising mixing aluminum sulfate with an aqueous solution having at least 10% by weight of an alkali metal, alkaline earth metal, or nitrogen containing base salt of an aliphatic alcohol sulfate having 1 to 30 carbon atoms, the moles of aluminum sulfate used per mole of neutralized salt being between about 0.001 to 6.

11. The method of claim 10 wherein said aliphatic alcohol sulfate salt has from 8 to 22 carbon atoms.

12. The method of claim 10 wherein the aqueous solution contains between about 10 and 60% of said aliphatic alcohol sulfate salt.

13. The method of claim 10 wherein said aliphatic alcohol sulfate salt contains a lauryl, oleyl, 2-ethyl hexyl, myristyl or lanolin radical.

14. The method of claim 13 wherein said aliphatic alcohol sulfate salt includes 0.5 to 100 ethoxy groups.

15. The method of claim 13 wherein said aliphatic alcohol sulfate salt includes 1 to 50 ethoxy groups.

16. An aqueous solution containing a precipitate of the formula:

$[R—OSO_3]_p·Al·Z[M_r(SO_4)_x]$ wherein R is the radical of an aliphatic alcohol having from 1 to 30 carbon atoms, M is a cation having a valence of $x$, selected from the group consisting of alkali metal, alkaline earth metal, and nitrogen containing base radicals, $x$ is 1 or 2, $p$ is from 0.167 to 6; Z is a number less than 1; $r$ is 1 or 2; $r$ is 1 when $x$ is 2 and $r$ is 2 when $x$ is 1.

* * * * *